United States Patent [19]

Takada

[11] 4,320,878
[45] Mar. 23, 1982

[54] VEHICLE OCCUPANT RESTRAINT BELT RETRACTOR

[76] Inventor: Juichiro Takada, 3-12-1, Shinmachi Setagayaku, Tokyo, Japan

[21] Appl. No.: 132,167

[22] Filed: Mar. 20, 1980

[30] Foreign Application Priority Data

Mar. 24, 1979 [JP] Japan .................. 54-033831

[51] Int. Cl.³ .................. A62B 35/02; B65H 75/48
[52] U.S. Cl. .................. 242/107.6; 280/807; 180/270; 297/475
[58] Field of Search .......... 242/107.6, 107.7, 107.12, 242/107.4 R–107.4 E; 280/801–803, 805–808; 297/475–478; 180/268–270

[56] References Cited

U.S. PATENT DOCUMENTS

| | | | |
|---|---|---|---|
| 3,825,205 | 7/1974 | Takada | 280/807 X |
| 3,880,380 | 4/1975 | Sugiura et al. | 242/107.6 X |
| 4,007,948 | 2/1977 | Stephenson et al. | 180/268 X |
| 4,199,172 | 4/1980 | Fukunaga | 242/107.6 X |

FOREIGN PATENT DOCUMENTS 52-33220  3/1977  Japan .................. 242/107.6

*Primary Examiner*—John M. Jillions
*Attorney, Agent, or Firm*—Brumbaugh, Graves, Donohue & Raymond

[57] ABSTRACT

A vehicle occupant restraint belt retractor includes a system for locking the belt reel against rewinding by an otherwise continuously operating rewind spring. The system locks in response to rotation of the belt reel with a time delay interposed between a cycle consisting of a small rotation in the unwinding direction followed by a small rotation in the winding direction which cycles a retractor switch via a clutched operating lever on the reel shaft.

2 Claims, 8 Drawing Figures

VEHICLE OCCUPANT RESTRAINT BELT RETRACTOR

FIELD OF THE INVENTION

The present invention relates to vehicle occupant restraint belt retractors and, in particular, to a retractor of the type in which the belt reel is continuously urged to rotate in the belt-winding direction by a winding spring.

BACKGROUND OF THE INVENTION

Most restraint belt retractors used in present-day vehicles have a winding or return spring which continuously acts on the reel and maintains tension in the belt. After even a relatively short time, the pressure of the tensioned belt against the occupant's body becomes bothersome to the occupant, often so much so that he or she is inclined to disconnect the belt with the obviously harmful results of no longer being restrained and being in great danger in the event of an accident or sudden stop. It is, therefore, very desirable that a belt retractor has some device for locking the belt in a comfortable, safe configuration, but that is not easy to do, given the variations in the sizes and sitting postures or vehicle drivers and passengers. Moreover, it is also desirable that such a device not restrict the occupant's movements, such as leaning forward to operate dashboard controls. It should respond reasonably promptly to changes in the occupant's sitting posture, but it should not respond so quickly as to lock against rewinding when it is not properly fitted to an occupant who has settled into a comfortable position.

SUMMARY OF THE INVENTION

There is provided, in accordance with the present invention, an improvement in a retractor of the type having a continuously active rewind spring connected to the belt reel, namely a system for locking the reel against rotation in the belt-winding direction which operates in response to rotation of the reel in the unwinding direction but only after a time delay following such rotation.

More particularly, the system includes a ratchet wheel affixed to the belt reel shaft and having locking teeth which face in the belt-winding direction. A pawl is mounted on the frame adjacent the reel for movement between a release position clear of the ratchet wheel and a lock position in engagement with a ratchet wheel tooth, in which position the reel is prevented from rotating in the belt-winding direction. An electromechanical activating device, such as a solenoidal actuator, is connected to and operates the pawl in response to a control circuit which is responsive to rotations of the reel.

The control circuit includes a retractor switch that is cycled by a lever rotatably mounted on the belt reel shaft and coupled to the shaft by a clutch. The clutch transmits shaft rotation to the lever but also allows the shaft to rotate when the lever engages the switch and when it engages a stop. When the belt reel rotates in the belt-unwinding direction, the lever engages and translates the retractor switch, and when it rotates in the belt-winding direction, it releases the retractor switch and re-engages the stop. Additional reel shaft rotation in either direction beyond such engagements of the lever is afforded by the clutch. It is the aforementioned full transfer and release cycling of the switch which triggers locking of the belt reel against rotation in the belt-winding direction.

An important aspect of the invention is the provision of a timer in the control circuit for delaying locking-actuation of the pawl for some time (e.g., 30 seconds) after the retractor switch is cycled, i.e., after the belt is pulled out and then pulls back slightly. The time delay leaves time for the occupant to assume a comfortably settled position in the seat before the reel locks against rewinding.

It is also desirable, though not essential, to disable the rewind locking device whenever the belt is unbuckled, or possibly when the vehicle door is open, or when the ignition switch is turned off, so that the belt will be rewound and be moved out of the way of the occupant. Suitable sensing switches for detecting the aforementioned conditions can be included in the control circuit of the pawl actuator.

For a better understanding of the invention, reference may be made to the following description of an exemplary embodiment, taken in conjunction with the figures of the accompanying drawings.

DESCRIPTION OF THE EMBODIMENT

Figure 1:
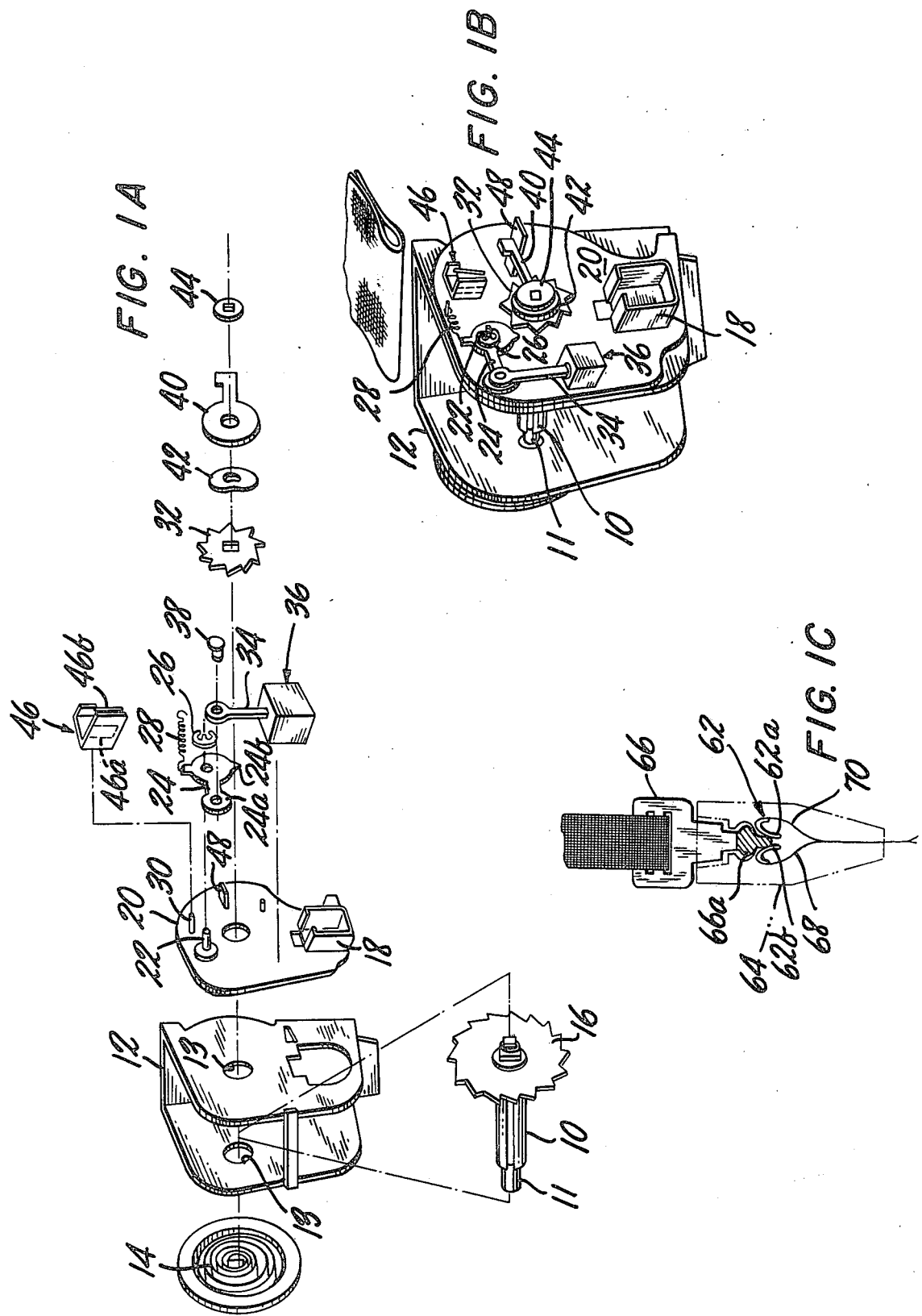
FIG. 1A is an exploded pictorial view of a retractor fitted with a rewind-locking system embodying the invention.
FIG. 1B is a pictorial view of the retractor shown in FIG. 1A assembled.
FIG. 1C is a plan view in generally schematic form of a buckle having a sensing switch useful in the control circuit of a retractor rewind-locking system.

The retractor comprises a belt reel 10 that is affixed to a shaft 11. The shaft 11 extends across the gap between the side portions of a U-shaped frame 12, is mounted for rotation in holes 13 in the frame and is continuously urged to rotate in the belt-winding direction by a rewind spring 14. A main locking ratchet wheel 16 on the reel locks the reel against rotation in the belt-unwinding or pullout direction when a main locking pawl (not shown) is moved into engagement with the wheel 16 by an inertia responsive mechanism (not shown), such as a pendulum, carried by a small casing 18. Various emergency locking mechanisms are known in the art, and inasmuch as the present invention does not relate to the locking of the reel against belt pullout, the locking mechanism is neither shown nor described in detail.

A mounting plate 20 similar in shape to the frame side portion is fastened (e.g., by welding, rivetting or cementing) to the outside face of the frame side portion. A small post 22 that extends out from the upper part of the frame receives a rotatable pawl 24 that is held in place on the post by an E-ring 26. A small tension spring 28 connected between a lug on the pawl and a pin 30 on the plate 20 urges the pawl clockwise (as seen in the drawings) about the post into a position clear of engagement with a ratchet wheel 32 that is affixed to the end of the reel shaft 11. The shaft 34 of a solenoid 36 that is cemented or otherwise fastened to the plate 20 is pivotably connected by a shoulder screw 38 to an arm portion 24a of the pawl 24 and upon energization of the solenoid coil (as described below) pulls the arm portion 24a down and pivots the pawl counterclockwise into a position in which the tip 24b of the pawl engages a tooth of the ratchet wheel 32.

The reel shaft 11 also receives a switch-activating lever 40 which is held under tight pressure between a wavy spring washer 42 and a press-fit retainer ring 44. The spring washer is a clutch which transmits shaft rotation to the lever but also allows the lever to slip on the shaft when rotation of the lever is impeded, as it is in two positions a short distance apart; when the belt reel rotates in the belt unwinding direction (counterclockwise) a small distance, the tip of the lever 40 engages and transfers to closed with a fixed contact 46a the movable contact 46b of a retractor switch 46 that is cemented (or otherwise fastened) to the plate 20, and when the reel rotates in the belt-winding direction (clockwise), the lever 40 engages a stop 48 on the plate.

Figure 2:
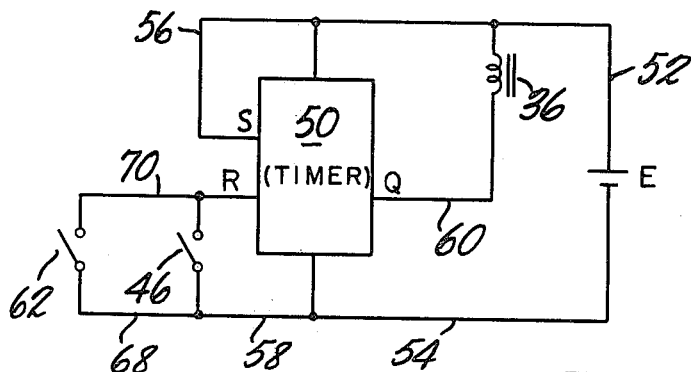
FIG. 2 is a schematic diagram of a control circuit for the rewind-locking system.

The energization of the solenoid and, therefore, the locking of the reel against belt-winding, is controlled by the circuit shown schematically in FIG. 2. The main component of the control circuit is a timer 50, preferably of the type having a flip-flop circuit with a time delay and priority reset, which is connected by leads 52 and 54 across a D.C. power source E (virtually always the vehicle battery). The plus side of battery E is connected by a lead 56 to the set terminal S of the timer, and the retractor switch 46 is connected in a lead 58 from the negative (or ground) side of the battery to the reset terminal R of the timer. The coil of the solenoid 36 is connected in a lead 60 from the plus side of the source E to the timer output terminal Q.

As an optional, but desirable, aspect of the invention, the control circuit also includes a switch 62 which detects whether the restraint belt is done up; as shown in FIG. 1C, the switch 62 consists of normally closed spring contacts 62a and 62b built into the buckle case 64 which are pushed open by an insulating tip 66a on a buckle tongue 66 when the tongue is hooked up to the buckle. The switch 62 is connected by leads 68 and 70 in parallel with the retractor switch 46 (see FIG. 2).

Figure 3:
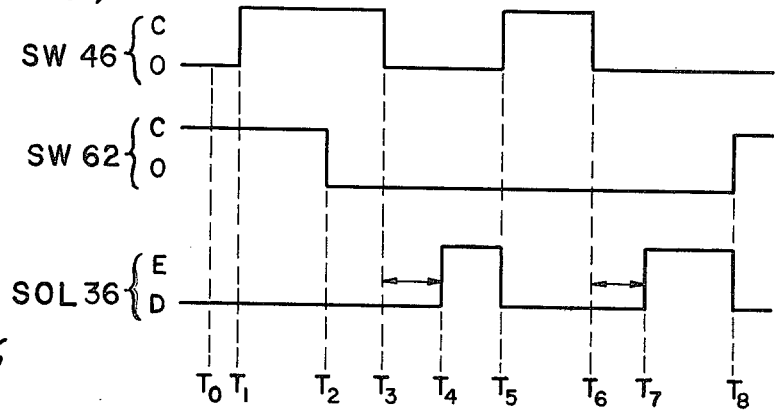
FIG. 3 is a timing diagram depicting the mode of operation of the circuit of FIG. 2.
Figure 4A:
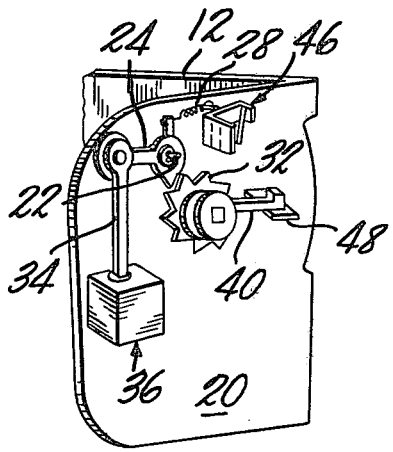
FIGS. 4A, 4B and 4C are pictorial views of the belt rewind-locking mechanism in different stages of its operation.
Figure 4B:
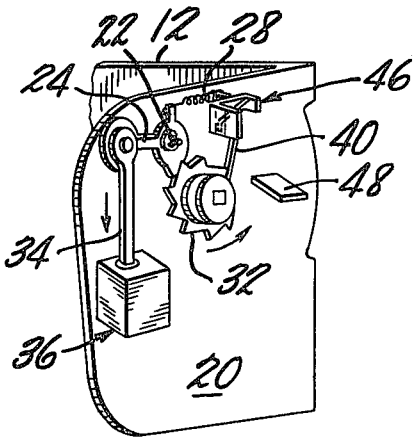

The timing chart (FIG. 3) and the operational views (FIGS. 4A, 4B and 4C) are helpful to understanding the mode of operation of the embodiment. When the vehicle is unoccupied and turned off and the seat belt is unbuckled (time $T_0$), the buckle switch is closed ("C"), and the retractor switch is open ("O"). Therefore, the solenoid 36 is de-energized ("D"), because unless both switches across which the timer reset R is connected to the power supply negative side are opened the plus voltage of the power supply is present at the timer output Q, and there is no voltage drop across (and hence no current flow through) the solenoid coil (36). (It is preferable in any case that the control circuit be wired to the battery through the vehicle ignition switch so that the whole control system is deactivated when the vehicle is turned off.) At this point the belt rewinding locking pawl 24 is held clear of the ratchet wheel 32 by the reset spring 28, as shown in FIG. 4A.

When an occupant pulls the belt from the retractor (time $T_1$), the rotation of the reel in the belt-unwinding direction (the arrow in FIG. 4B), moves the lever 40 with the reel shaft and the lever transfers the movable contact 46b into engagement with the fixed contact 46a of the switch 46. When the occupant fastens the belt buckle 64 at time $T_2$, the contacts of the buckle switch are pushed open (see FIG. 1C), but since the retractor switch 46 is still closed (which presupposes that the belt has not been allowed to rewind), the plus voltage remains at the timer output Q.

Figure 4C:
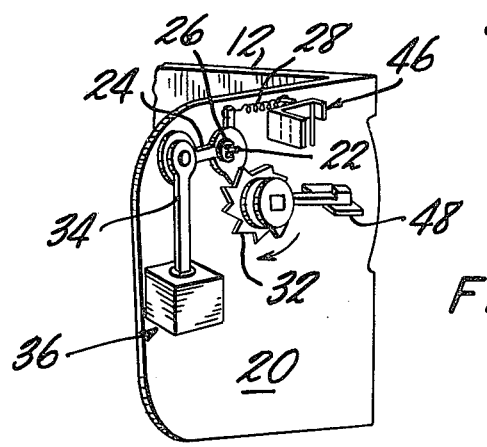

When the occupant releases the belt, the rewind spring rotates the reel in the rewinding direction (the arrow in FIG. 4C), and the lever 40 releases the retractor switch (time $T_3$) which, therefore, now completes a full cycle from transfer to closed by the lever 40 and back to open (FIG. 4C). After a time delay of a suitable duration (e.g., 30 seconds), as indicated by the arrowed line in FIG. 3, the output voltage at the terminal Q drops to that of the negative side of the power supply E, thereby impressing a voltage drop across the solenoid and energizing ("E") the coil (time $T_4$). The solenoid pole piece 34 is pulled down and pulls the pawl 24 counterclockwise against the reset spring 28 so that the tip 24b can engage a tooth of the ratchet wheel 32. The time delay ($T_3$ to $T_4$) allows the occupant time to settle into a comfortable position.

Sooner or later, say at time $T_5$, the occupant will change position and in the process pull on the belt. When the retractor switch 46 is closed by the lever 40 (FIG. 4B), plus voltage is restored at the timer output Q, and the reset spring 28 pulls the pawl 24 clear of the ratchet wheel 32, thereby allowing the belt to rewind from time $T_5$ to $T_6$. After the time delay $T_6$ to $T_7$, the solenoid is again energized ("E") and the reel is again locked against rewinding. Finally, when the occupant undoes the buckle (at time $T_8$) to get out of the vehicle, the buckle switch 62 closes, the solenoid 36 is de-energized ("D"), thereby permitting the reset spring 28 to release the pawl so that the belt can rewind onto the reel. At all times, the belt reel can be rotated in the unwinding direction, because the ratchet teeth of the ratchet wheel 32 lock only against rotation in the winding direction, and the solenoid yields to the camming action of the back edges of the teeth. The belt-rewind locking system also has no effect on the normal operation of the emergency locking system.

There are numerous ways in which the above-described embodiment can be modified. Some examples are:

(1) the control circuit can be interlocked to a door switch wired in parallel with the switches 62 and 46 and closed when the door is open and open when the door is closed;

(2) other types of timers can be substituted for the flip-flop type, in which case it is well within the skill of the art to design the switch logic circuits for reset;

(3) the action of the solenoid 36 and reset spring can be reversed (normally energized solenoid for unlocking and spring 28 for locking), and the reset spring can be coupled to the solenoid pole piece in either mode);

(4) other electro-mechanical drive devices can be substituted for the solenoid to shift the locking pawl;

(5) the control circuit can be designed to enable the delay time to be adjusted by the occupant, such as by a dashboard control;

(6) a manual control switch can be connected between the timer R reset and the power source E negative so that the occupant can switch the system off;

(7) a manual switch can be connected in parallel with the time delay circuitry so that the occupant can override the set time delay of the timer circuit and impose a shorter time delay at will;

(8) other lever clutch and switch types can be substituted for those of the embodiment;

(9) the invention can be used with various types of emergency locking retractors as well as with various other types of belt retractors.

Thus, the invention effectively and simply solves the problem of constant belt tension common to many conventional retractors. No longer need the occupant be made uncomfortable by the pressure of a tensioned belt against his body, and he or she will not, therefore, be tempted to undo the belt (if that can be done in any case) and will be safely restrained. The time delay gives the occupant time to settle into a comfortable position before the belt locks against rewinding, and the time delay greatly reduces the possibility of the belt being locked against rewinding in a slackened, less-safe state. The system is fully adaptable to persons of all sizes and shapes. It does not restrict movement of the occupant to different seating postures or prevent the belt from pulling out when the occupant leans forward, nor does it impair locking of the reel against belt pullout in an emergency (in the case of emergency locking type retractors). The control circuit can use solid state devices and can, because of its small size and weight in such solid state designs, easily be installed under the seat or other convenient, out-of-the-way places in the vehicle.

I claim:

1. In a vehicle occupant restraint belt retractor having a rotatable belt reel that is journalled on a frame and is normally urged to rotate in the belt-winding direction by a winding spring, the improvement of a system for selectively locking the reel against rotation in the belt-winding direction comprising a ratchet wheel affixed to the reel shaft and having ratchet teeth facing in the belt-winding direction; a pawl mounted on the frame for movement between a release position clear of the ratchet wheel and a lock position in engagement with a ratchet tooth for preventing rotation of the reel in the belt-winding direction; a retractor switch mounted on the frame; a retractor switch control lever rotatably mounted on the reel shaft and selectively engageable with the switch to transfer it to one position when the reel is rotated in the belt-unwinding direction and to release it to the other position when the reel rotates in the belt-winding direction and engageable with a stop on the frame when the reel is rotated in th belt-winding direction; clutch means interposed between the lever and the shaft for transmitting rotary motion from the shaft to the lever while permitting rotation of the shaft relative to the lever; electrical actuating means for shifting the pawl into engagement with the ratchet wheel, and control means for controlling the actuating means including timer means for delaying locking engagement of the pawl with the ratchet for a predetermined time after a full transfer and release cycle of the retractor switch by the control lever in response to belt-unwinding followed by belt-rewinding rotation of the reel.

2. The improvement according to claim 1 wherein the belt includes a buckle and the control means includes a switch in the buckle which prevents the actuating means from locking the pawl to the ratchet when the buckle is unfastened and which enables the actuating means to lock the pawl to the ratchet wheel only when the buckle is fastened.

* * * * *